US009119204B2

(12) United States Patent
Kakadia et al.

(10) Patent No.: US 9,119,204 B2
(45) Date of Patent: Aug. 25, 2015

(54) USER BASED NETWORK COMPONENT ANALYTICS

(71) Applicants: VERIZON PATENT AND LICENSING INC, Basking Ridge, NJ (US); CELLCO PARTNERSHIP, Basking Ridge, NJ (US)

(72) Inventors: Deepak Kakadia, Antioch, CA (US); Zuhair B. Moin, Danville, CA (US)

(73) Assignees: VERIZON PATENT AND LICENSING INC., Basking Ridge, NJ (US); CELLCO PARTNERSHIP, Basking Ridge, NJ (US)

( * ) Notice: Subject to any disclaimer, the term of this patent is extended or adjusted under 35 U.S.C. 154(b) by 173 days.

(21) Appl. No.: 13/829,618

(22) Filed: Mar. 14, 2013

(65) Prior Publication Data

US 2014/0269630 A1 Sep. 18, 2014

(51) Int. Cl.
*H04J 3/00* (2006.01)
*H04W 72/04* (2009.01)

(52) U.S. Cl.
CPC ................................ *H04W 72/0446* (2013.01)

(58) Field of Classification Search
None
See application file for complete search history.

(56) References Cited

U.S. PATENT DOCUMENTS

| | | | |
|---|---|---|---|
| 6,385,301 | B1 | 5/2002 | Nolting et al. |
| 6,996,374 | B1 | 2/2006 | Bao et al. |
| 7,260,192 | B2 | 8/2007 | Nolting et al. |
| 7,272,379 | B1 | 9/2007 | Tang et al. |
| 7,933,557 | B1 * | 4/2011 | Townley et al. ............ 455/67.11 |
| 2008/0125082 | A1 * | 5/2008 | Salo .............................. 455/406 |
| 2012/0115433 | A1 * | 5/2012 | Young et al. .................. 455/406 |

* cited by examiner

*Primary Examiner* — Chi H Pham
*Assistant Examiner* — Fahmida Chowdhury

(57) ABSTRACT

A data record server is configured to receive transmission measurement data from one or more network components containing information about one or more packet data communications and create a data record for each of packet data communications. Data records corresponding to a particular network component are identified, associated with one or more time slots in a data measurement compilation, and used to analyze the resource usage of a network component by one or more of the subscribers or mobile devices.

20 Claims, 8 Drawing Sheets

Network Component ID:

Device ID:

Start Time:

Stop Time:

Data Transmitted:

USER BASED NETWORK COMPONENT ANALYTICS

BACKGROUND

Various pieces of information about the use and performance of a telecommunication network may be collected. Network components may record various performance indicators and transmit information to a server where the performance indicators may be analyzed and used in network optimization and design. For example, network optimization may involve predicting future demand based on past results, evaluating the capacity of equipment and facilities, and providing the correct amount of capacity in the proper configuration, in time to meet service objectives. Since virtually every element of a telecommunications system is subject to failure or overload, effective testing, monitoring, control, and maintenance is essential to obtain an acceptable level of performance. In this manner, the server analyzing network resources is able to determine the amounts of usage of various network resources by all subscribers. However, the server is unable to determine how much of the networking resources are attributed to individual subscribers.

Separate systems and procedures may analyze individual usage, for example, for billing or the like. Information about the use of the telecommunication network by particular subscribers may also be collected and provided to a server. The information about the amount of data used by a subscriber and the amount of time the subscriber uses the telecommunication network may be recorded and used to determine how much to bill the subscriber for telecommunications services. In this manner, the amount of data an individual subscriber transmits or receives over the telecommunication network or the amount of time that the subscriber uses the telecommunication network may be determined. However, this type of usage information is typically based on communications to/from the user' premises or device and thus is not associated with the network resources needed or consumed to provide such individual service. As a result, the server analyzing individual user data is unable to determine the amount of network resources of a particular network component used by a subscriber or the particular subscriber's/user's device.

Hence a need exists for determining how much of a specific network component's resources can be attributed to a particular subscriber.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 shows various fields of information, which may be included in transmission measurement data.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The examples disclosed herein relate to determining the amount of resources of a specific network component used by a particular subscriber. The usage analysis may be adapted to a variety of different types of networks offering various data communications service. For discussion purposes, the examples will focus on a network that offers mobile communication services. A network component (e.g., an EnodeB, a base station, or another node in the network) can record performance indicators that show utilization of resources for the network component (e.g., the CPU utilization). In addition to recording the performance indicators, however, it may be desirable to be able to determine how much of a specific network component's resources can be attributed to a particular subscriber. For example, different rates may be charged to subscribers based on the amount of resources for particular network components used by each subscriber. For example, subscribers using a greater amount of resources for an in-demand network component during peak times may be charged a higher fee than other subscribers that do not use the in-demand network component during peak times.

Figure 1:
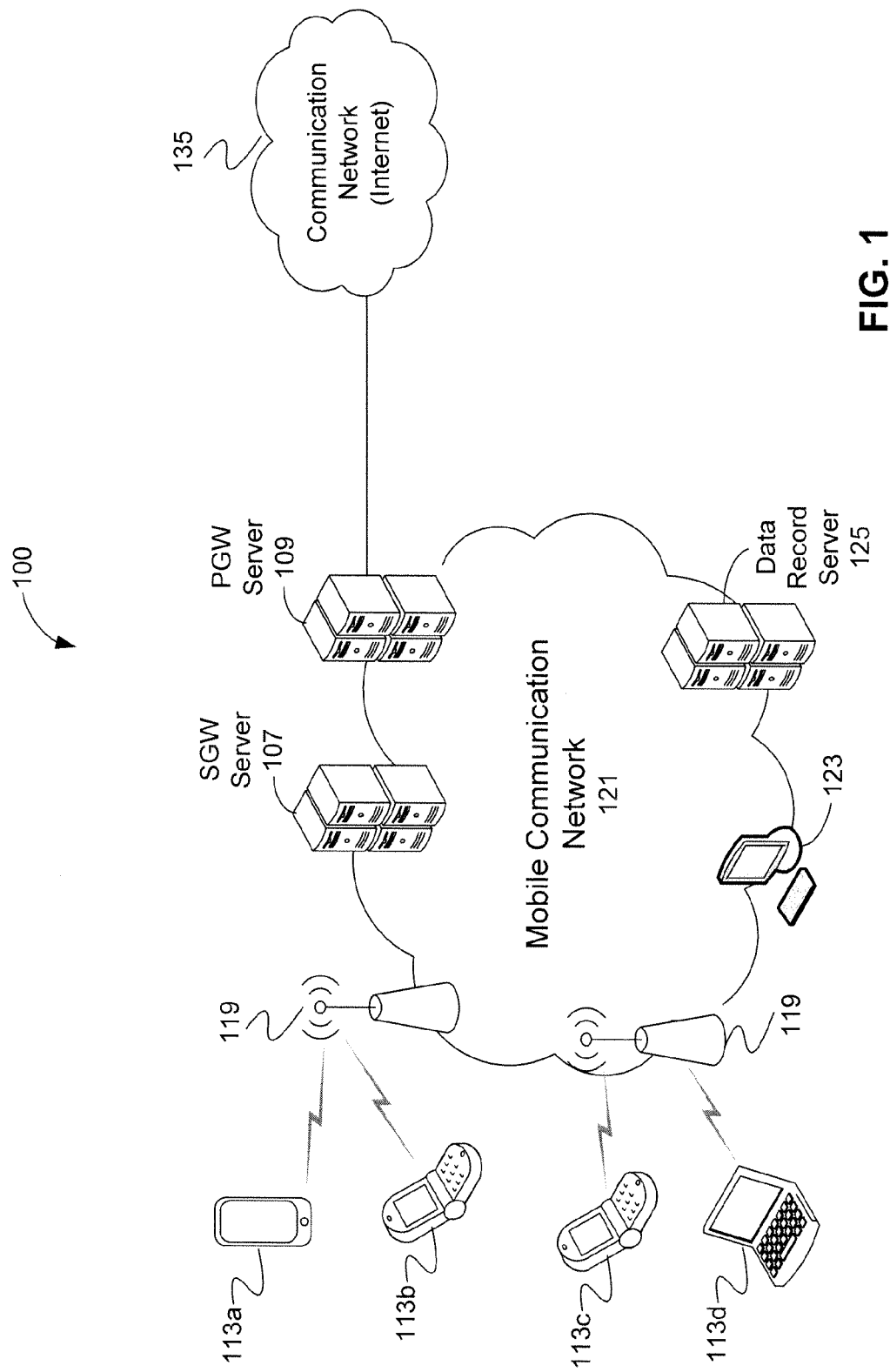
FIG. 1 is a high-level functional block diagram of an example of a network environment that may be involved in analyzing resource usage of a network component by one or more individual users or subscribers.

Reference now is made in detail to the examples illustrated in the accompanying drawings and discussed below. FIG. 1 is a high-level functional block diagram of an example of a network environment that may be involved in analyzing resource usage of a network component. The network environment 100 in FIG. 1 includes a mobile communication network 121 that is coupled to one or more other communication networks. In FIG. 1, the mobile communication network 121 is shown coupled to communication network 135 (e.g., the Internet).

The mobile communication network 121 may be operated by a carrier or service provider to provide a wide range of mobile communication services and ancillary services or features to its subscriber customers and associated device users. The elements generally indicated by the reference numeral 121, the base stations 119, and mobile devices 113a to 113d, servers 107 and 109 are elements of the mobile communication network 121 and are operated by or on behalf of the carrier, although the devices 113a to 131d typically are sold to the carrier's customers. The network environment 100 provides communications between the devices 113a to 113d as well as communications for the mobile devices 113a to 113d with networks and stations outside the mobile communication network 121.

For purposes of later discussion, several users' mobile devices 113a to 113d appear in the drawing, to represent examples of the devices that may receive various services via the network environment 100. Today, many devices are mobile devices that take the form of portable handsets, smart-phones, tablet computers, or personal digital assistants (PDAs), although they may be implemented in other form factors, including consumer and business electronic devices. In FIG. 1, for example, mobile devices 113*a*, 113*b*, 113*c*, and 113*d* may be in the form of a smart-phone or tablet, a portable handset, or a laptop configured to communicate wirelessly with the mobile communication network 121.

In other examples (not shown in FIG. 1), devices that communicate with the mobile communication network 121 may include more stationary devices such as desktop computers, gaming consoles, set top boxes, or other devices that may operate in much the same way as mobile devices 113*a* to 113*d*. The desktop computers may include applications, such as browsers or other applications, transmitting and receiving data over the mobile communication network 121. Subscriber customers may also use these more stationary devices to access the communication services and ancillary services provided by the communication network operated by or on the behalf of the carrier.

In a network like 121, communication traffic for the mobile devices flows over the air through the base stations 119 as well as through other elements of the network 121 such as the exemplary serving gateway (SGW) server 107 or the exemplary packet data network gateway (PGW) server 109. For discussion purposes, the base stations 119 and/or the gateway server are examples of network components that may create data records of packet data communications for the mobile devices through such node of the mobile network. As discussed in more detail later, each data record of a mobile device's packet data communication includes the time of a respective packet data communication, an identification of a mobile device involved in the respective packet data communication, and an amount of usage of a resource of the network component by the respective packet data communication. The base stations 119, the SGW server 107, the PGW server 109, and/or other network components in the network 121 send these records to a data processing system for storage and analysis. In the example, the data processing system includes a data record server 125, which receives the records and processes the data from the records to compile a database for resource usage analytics. The data record collection and processing supports per use analytics of the resource usage by various subscribers' mobile devices. For example, the network 121 may also include or communicate with a user terminal or computer such as shown at 123, for use by a network administrator, technician or other personnel to view the information in the data measurement compilation, review the generated resource usage analytics, and request per user analytics for one or more subscriber mobile devices.

As discussed in more detail later, each of the data records collected via server 125 are associated with one or more time slots of operation of the particular network component that provided the record, based on the times of packet data communications. Some data records will be for respective packet data communications spanning at least partially into a number of the time slots of network or network component operation. For each of those types of records, the data record for a respective packet data communication is associated with each of the time slots that the respective packet data communication at least partially spanned into. A portion of the amount of usage of the resource of the network component for the respective packet data communication spanning at least partially into a number of time slots is allocated to each of those time slots. As a result, the usage analysis is able to take into account resource usage at the network component by a particular mobile device; and, for example, the analysis can consider amounts of usage by that device for different time slots of network or network component operation based on the usage allocations.

Returning to the example of FIG. 1 for more detail, the network environment 100 may allow users of at least some of the mobile devices to initiate and receive communications such as telephone calls to each other as well as through the public switched telephone network (PSTN) and telephone stations connected thereto. In the example, the network environment 100 also offers a variety of data services via the communication network 135 (e.g., the Internet), such as uploads and downloads, web browsing, e-mail, multimedia content, etc. The network environment 100 typically is implemented by a number of interconnected networks. Hence, the network environment 100 may also include a number of radio access networks (RANs), as well as regional ground networks interconnecting a number of Radio Access Networks (RANs) and a wide area network (WAN) interconnecting the regional ground networks to core network elements, such as the Multimedia Messaging Service Centers (MMSCs). A regional portion of the network environment 100, such as the portion of the network serving the exemplary mobile devices 113*a* to 113*d* will typically include one or more RANs and a regional circuit and/or packet switched network and associated signaling network facilities.

Physical elements of a RAN, operated by one of the mobile service providers or carriers, include a number of base stations represented in the example by the base stations (BSs) 119. Such base stations 119 typically comprise a base transceiver system (BTS) which communicates via an antennae system at the site of base station and over the airlink with one or more of the wireless devices 113*a* to 113*d* when the wireless devices are within range. Each base station 119 typically includes a BTS coupled to several antennae mounted on a radio tower within a coverage area often referred to as a "cell." The BTS is the part of the radio network that sends and receives radio frequency (RF) signals to/from the wireless devices that the base station currently serves.

Different types of base stations may be used for different wireless technologies. For example, mobile communication networks that use long-term evolution (LTE) technologies, base stations 119 may comprise E-UTRAN Node B (EnodeB) components configured to communicate with one or more of the wireless devices 113*a* to 113*d*. The radio access networks also include a traffic network represented generally by the cloud of the mobile communication network 121, which carries the user communications for the mobile devices 113*a* to 113*d* between the respective base stations 119 and other elements with or through which the mobile devices 113*a* to 113*d* communicate. Individual elements such as switches and/or routers forming the traffic network are omitted here for simplicity.

The mobile communication network 121 portion of the network environment 100 connects to a packet switched data communication network 135, such as the network commonly referred to as the "Internet." Although not shown, network 121 may also connect to other packet networks, such as private intranets of the carrier and/or other third parties that offer content to mobile device users. Packet switched communications via the traffic network 121 and the Internet 135 may support a variety of user services through the network environment 100, such as mobile device communications of text and multimedia messages, e-mail, web surfing or browsing, programming, and multimedia downloading, and other services that involve transmitting and receiving data via the mobile communication network 121.

The SGW server 107 may be configured to route and forward data packets for mobile devices 113a to 113d while the PGW server 109 provides connectivity for the mobile devices 113a to 113d to external networks such as communication network 135. The SGW server 107 and the PGW server 109 may also be configured to monitor and record the amount of resources used in each packet data communication and transmit the transmission measurement data for those communications to the data record server 125. The PGW server 109 may also determine an amount of data transferred by the mobile communication network 121 for each mobile device (e.g., mobile device 113a). For example, bytes of user data carried in data packets received by PGW server 109 addressed to or originating from the mobile device 113a may be counted by the PGW server 109 for account billing purposes. It should be noted that while only a single SGW server 107 and a single PGW server 109 are illustrated in FIG. 1 for simplicity, actual network deployments typically will include some larger number of such servers. Also, different types of gateway servers may be used for different wireless technologies. For example, a high availability (HA) server can be used for 3G; general packet radio service core network (GGSN) for 2G, 3G, and wideband code division multiple access (WCDMA); etc. Also, the counts are typically collected and processed through other systems (not shown) for bill processing or account debiting.

Figure 2A:
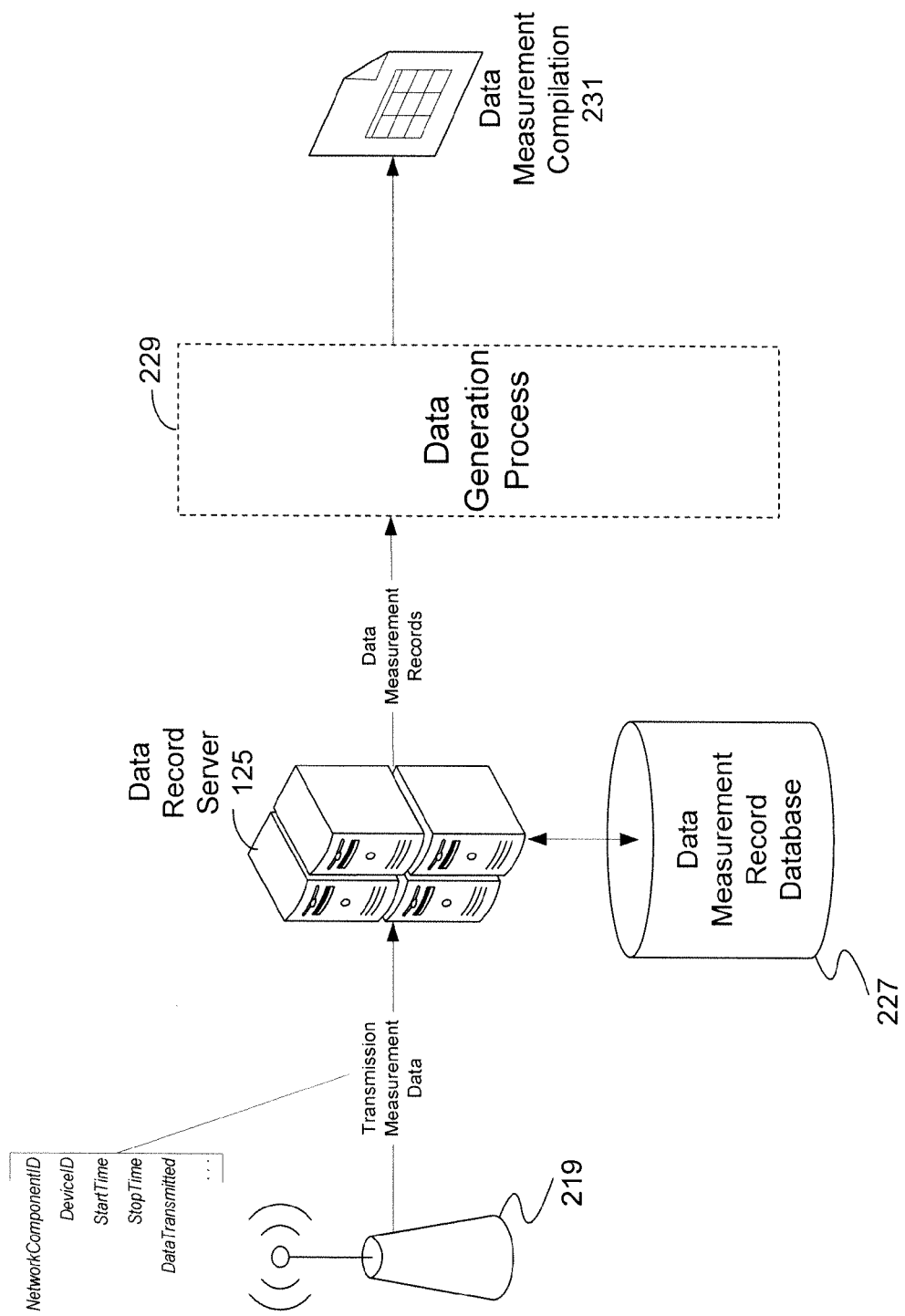
FIG. 2A is a block diagram providing an overview of a process that may be used in determining an amount of resources of a specific network component used by a particular subscriber.

Various aspects of the subject technology provide a way to determine the amount of resources of a specific network component used by a particular user or user's device. FIG. 2 is a block diagram providing an overview of a process that may be used in determining an amount of resources of a specific network component 219 used by a particular device of a user. One or more network components 219 in the mobile communication network 121 may be configured to record performance indicators for packet data communications (e.g., data transmissions) to or from a user's device. The network components 219 monitoring operations and sending the measurement data may include EnodeB nodes, other types of base stations 119, the SGW server 107, the PGW server 109, or any other component of mobile communication network 121.

For each packet data communication with a user's device 113a, the network component 219 may record transmission measurement data such as an identifier for the network component 219, a user's mobile device identifier, a start time for the packet data communication, a stop time for the packet data communication, and an amount of resources consumed during the transmission. The mobile device identifier may be an International Mobile Subscriber Identity (IMSI), a mobile phone number, a hardware identifier, or some other identifier. The data for the amount of resources consumed during the transmission, for example, may include one or more of a number of bytes transmitted, a processor load at the component 219, a bandwidth used, and/or any other measurement of computing or network resources. For simplicity, the examples below are discussed with respect to monitoring the number of bytes transmitted to or from a user's mobile device, although, in other examples, alternative or additional resources may be similarly monitored.

Figure 2B:
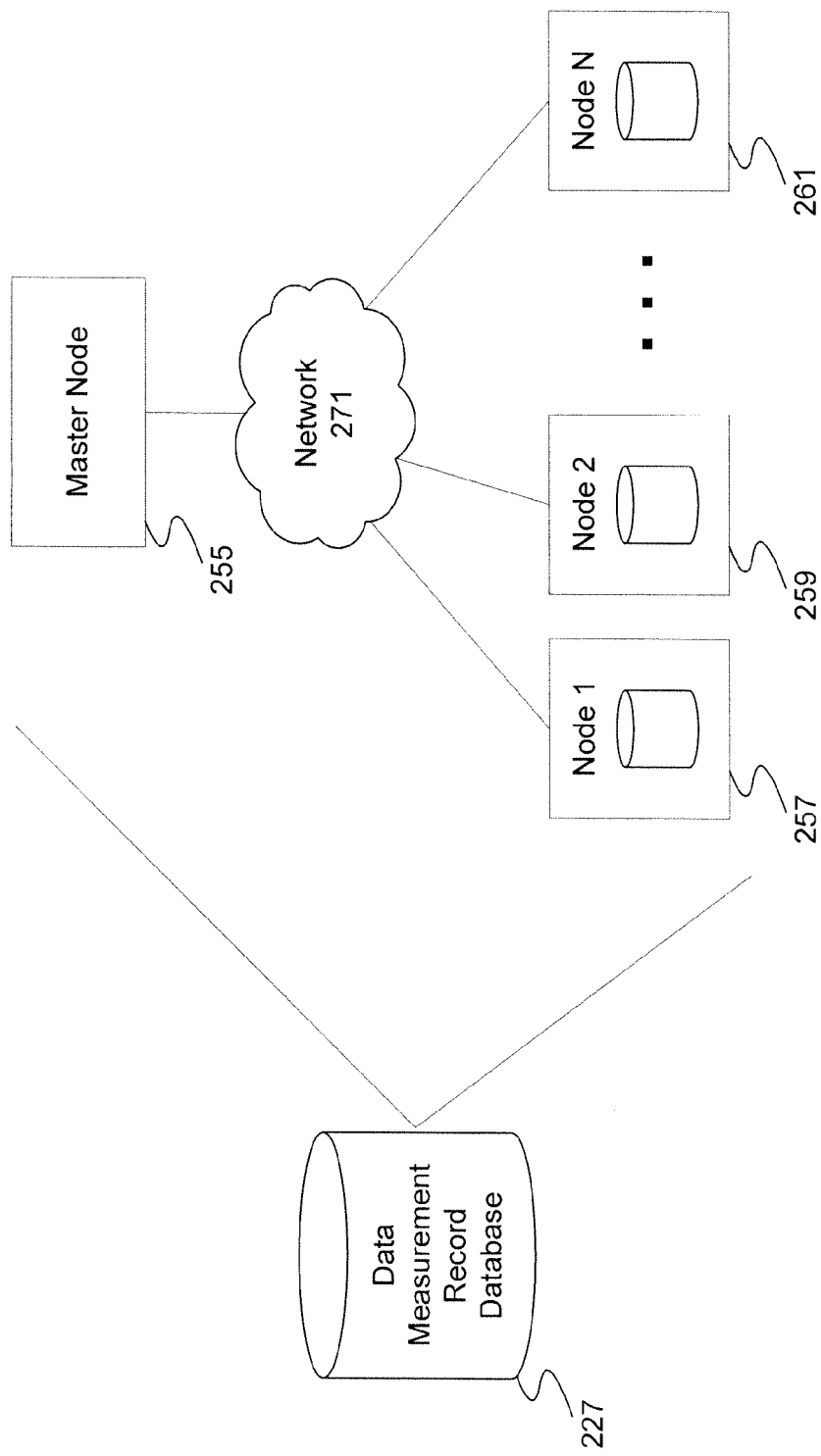
FIG. 2B is a block diagram illustrating an example data measurement record database.

After the transmission measurement data is gathered by the network component 219, the measurement data is provided to a data record server 125. The data record server 125 may be configured to store each of the transmission measurement data as a record in a data measurement record database 227. FIG. 2B is a block diagram illustrating an example data measurement record database. The data measurement record database 227 may be implemented as a horizontally scalable database in a distributed computing environment, such as a database implementing a Hadoop framework. Accordingly, the data measurement record database 227 may be implemented as a cluster of computing machines in communication with one another. For example, in FIG. 2B, the data measurement record database may be implemented as a cluster of nodes (e.g., node 255, 257, 259, and 261) connected via a network (e.g., network 271). Each node may be a separate computing machine with a processor and memory capable of storing data and performing database functions. The functions of the data measurement record database 227 may be divided into smaller fragments of work by one of the computing machines (e.g., master node 255) and each of the smaller fragments of work may be executed or re-executed on any machine in a cluster of machines (e.g., nodes 257, 259, and 261). The data stored by the data measurement record database 227 may also be divided by one of the computing machines (e.g., master node 255) into a distributed file system that stores data on the cluster of machines (e.g., nodes 257, 259, and 261).

Each record stored in the data measurement record database 227 may include transmission measurement data such as, for example, an identifier for the network component 219, a device identifier (in this example, for the user's mobile device), a start time for the packet data communication, a stop time for the packet data communication, and an amount of resources consumed during the transmission. A data generation process 229, which may be executed by the data record server 125 or another system, uses these records to determine the amount of resources for a specific network component 219 used by a particular user's device (e.g., mobile device 113a) and stores the information in a data measurement compilation 231. The data measurement compilation 231 may include one or more files that may be used by another process or entity to quickly determine the resources of a specific network component 219 used by a particular user or group of subscriber at a given time or time period.

The data record server 125 may generate a data measurement compilation 231 by retrieving and processing the data measurement records for a number of packet data communications for a particular network component 219. Some data communications may start and end within a given predefined time slot. However, others will start, continue during and/or end in different time slots. The data record server 125 therefore may associate each data record for a respective packet data communication with one or more time slots (or bins), representing time periods of operation for the network component 219, based on the data in the data records. A packet data communication at least partially spans a time slot if the communication starts during, continues throughout, or ends in the time slot. In our example, the data record server 125 may associate a data record for a packet data communication with time slots that the packet data communication spans into, at least partially, based on the time of the respective packet data communication (e.g., the start time and end time for the packet data communications as indicated in the data record for the communication).

The data record server 125 may also allocate a portion of the amount of network resources used (e.g. the amount data transmitted) in the packet data communication to each of those time slots. For example, an average number of bytes of data transmitted (for a particular device and using a particular network resource(s)) per time period between the start time and the stop time may be calculated based on the total number of bytes transmitted over that time span. The average number of bytes may then be distributed to time periods/slots/bins in the data management compilation that correspond to the time span between the start time and the stop time. In one simplified example scenario, if a data packet communication for a subscriber starts at time slot t1, ends at time slot t10, and transfers 10 bytes and the time slots are of 1 minute each, the average number of bytes transmitted per time slot is calculated to be 1 byte per time slot. Accordingly, 1 byte of information transmitted on behalf of the subscriber may be attributed to each time slot from t1 to t10.

After the records are associated with time slots in the data measurement compilation 231, the data record server 125 may analyze the resource usage of the network component by one or more mobile devices based on the information stored in the data measurement compilation, for example, upon request from and/or for output via a user terminal such as generally represented by terminal device 123 in FIG. 1.

Figure 3A:
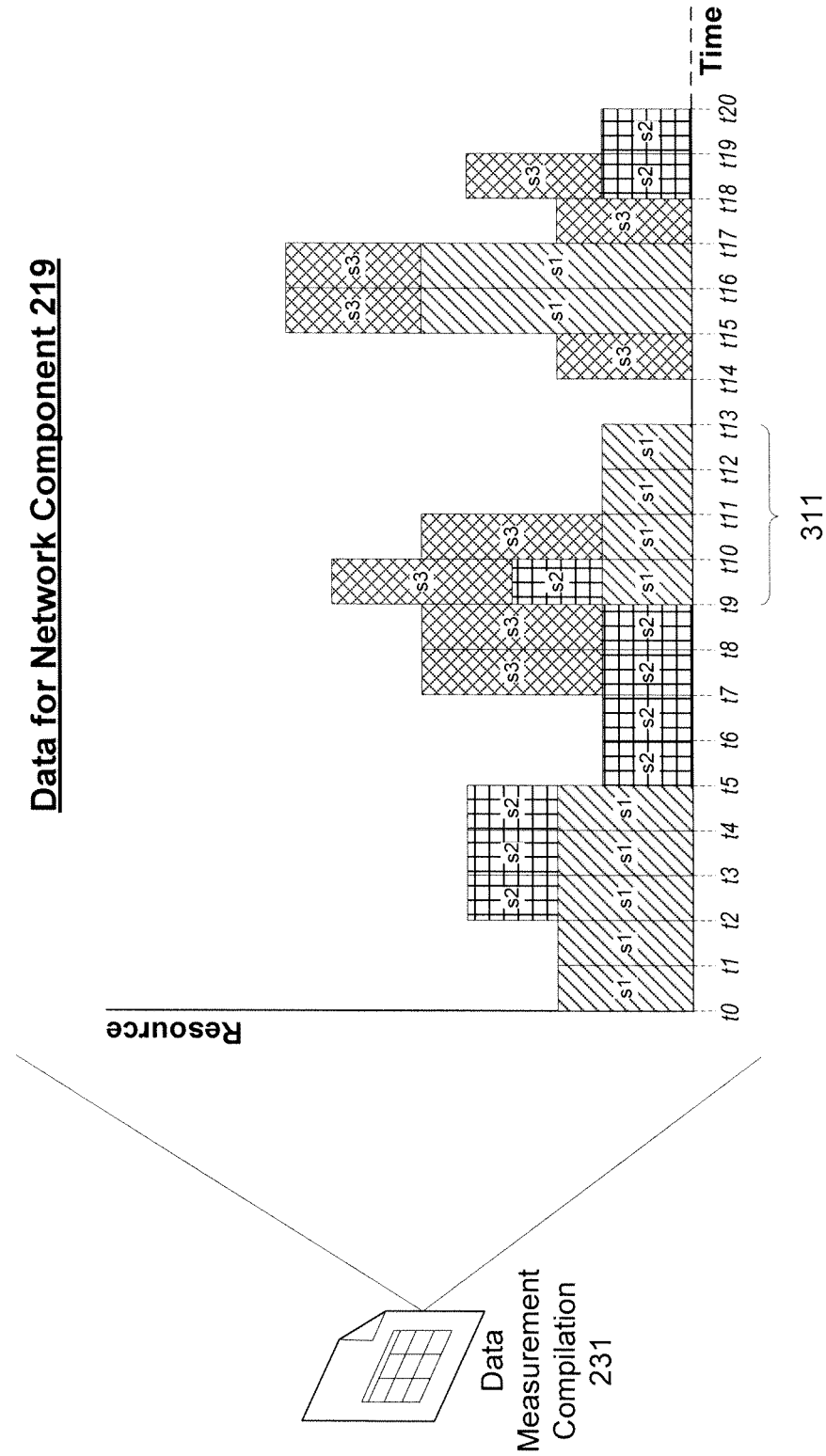
FIG. 3A is a visualization of a simple example of data measurement compilation.

FIG. 3A is a diagram illustrates a visualization 300 of a simple example of the data measurement compilation 231. In this example, the visualization 300 of the data measurement compilation 231 shows the transmission measurement data for network component 219 for a certain time period (e.g., the time period from t0 to t20). Each time period represents a separate slot or bin for usage analysis purposes. Although visualization 300 only shows transmission measurement data for one network component (e.g., network component 219), the data measurement compilation 231 may include transmission measurement data for a number of other network components. Each time period may be of a set constant length (e.g., 50 milliseconds). As described above, information for a number of packet data communications made via a particular network component (e.g., network component 219) may be extracted from data measurement records and used to assign amounts of data to a series of time periods which may be represented by slots.

For example, in FIG. 3A, the time period between t0 to t1 is represented by one bin or column in the visualization, the time period between t1 to t2 may be represented by another bin or column, the time period between t2 to t3 may be represented by another bin or column, and so on. The data record server 125 receives transmission measurement data for a number of packet data communications from network component 219 and creates a data measurement record for each of the packet data communications. Each data measurement record may identify a user device (e.g., s1, s2, or s3), a network component (e.g., a particular network component 219 that provided the measurement data), one or more measurements of network resources consumed (e.g., an amount of data transmitted), a transmission start time, and a transmission end time. The one or more measurements of network resources consumed by a particular subscriber may then be assigned to time periods in the data measurement compilation 231 based on the transmission start time and end time.

In the scenario illustrated in FIG. 1, the data record server 125 may create, based on the received transmission measurement data, a data measurement record that indicates that network component 219 transmitted x bytes of data on behalf of user device s1 starting from time t9 to time t13. Accordingly, the data record server 125 may determine that the transmission of the data packet communication spans at least partially 4 time slots; more specifically, the data packet communication occurred in some or all of the time slots from time t9 to time t13. The server 125 may allocate the total number of bytes transmitted on behalf of mobile device s1 indicated in the received usage measurement data among the 4 time slots. Although other allocation techniques may be used, in one example, the data record server 125 calculates an average amount of bytes transmitted for the user device over 4 time slots and assigns the average number of bytes to each of the 4 time slots (e.g., the time slots for the time period between t9 to t10, the time period between t10 to t11, the time period between t11 to t12, and the time period between t12 to t13). Reference number 311 in FIG. 3A depicts the result of assigning the number of bytes for user device s1 to these 4 time periods.

Additional data measurement records may be similarly processed by the data record server 125. For example, the data record server 125 may retrieve other data measurement records for network component 219 for packet data communications that occurred from time t0 to time t20. The packet data communications that used the resources for network component 219 may have been transmitted on behalf of one or more subscribers (e.g., subscribers s1 to s3 in FIG. 3A). For each data measurement record, the data record server 125 may identify the time slots during which the respective packet data communication was transmitted and allocate a portion of the amount of bytes transmitted (or other types of resource usage amounts) during each packet data communication to each of the respective time slots. After all of the data measurement records for packet data communications that occurred from time t0 to time t20 for the relevant user devices are processed, the data measurement compilation 231 from time t0 to time t20 may appear as visualization 300 in FIG. 3A.

After the retrieved data measurement records are processed, the resulting data measurement compilation 231 may be used to determine which subscribers are using the network component 219 at a particular time period (e.g., the time period between t3 and t15 in FIG. 3A) and how much of a particular network resource is attributed to each subscriber. For example, in FIG. 3A, the visualization 300 of the data measurement compilation 231 may be used to determine how much data is being transmitted to or from each subscriber's device through the particular network resource during the a particular time period, the relative amount of data being transmitted via the resource as compared to the total number of bytes being transmitted through the resource by all devices during the time period, and/or the relative amount of data being transmitted via the resource for one device as compared to the number of bytes being transmitted to other subscribers' device during the time period.

The information derived from the data measurement compilation 231 may also be used for a variety of purposes. In one scenario, a rate or fee to be charged to a subscriber may be calculated or adjusted based on the subscriber's use of particular network components (e.g., in-demand network components) or the subscriber's use of particular network components at specific times (e.g., times when the network components are in demand). For example, subscribers that use in-demand network components, subscribers that use the mobile communication network 121 during generally high-demand periods (e.g., peak times), or subscribers that use in-demand network components when those specific components are in high-demand may be charged more, and users who do not may receive a discount (or some other promotion—such as a coupon for goods and/or services from the carrier of the subscriber or a partner of the carrier).

In other scenarios, the information may used to identify an optimal data plan for a subscriber, which may be suggested to the subscriber if the subscriber currently has a different data plan. For example, subscribers may be offered different data plans that may be based, at least in part, on how much users use high-demand network components, how much users use network components during peak times, or how much users use high-demand network components during peak times.

Each data plan may be associated with a cost with additional costs being levied when subscriber usage exceeds amounts specified in the data plan. The typical cost for each data plan may be calculated based on the a subscriber's usage history and the data plan with the lowest typical cost may be suggested to the subscriber. Promotions and other features may also be suggested to the subscriber based on the subscriber's data usage patterns. The subscriber's data usage patterns may also be used to determine the location of the user and locations where the user is active on the mobile communication network 121 and patterns of such usage locations.

A index may also be generated during the data generation process 229 that allows for fast retrieval of subscriber usage data. The index may be generated along with the data measurement compilation 231 or instead of it. For example, the data record server 125 may generate an index by retrieving and processing the data measurement records for a number of packet data communications for a particular network component 219. The generated index may provide for a quicker lookup process.

Figure 3B:
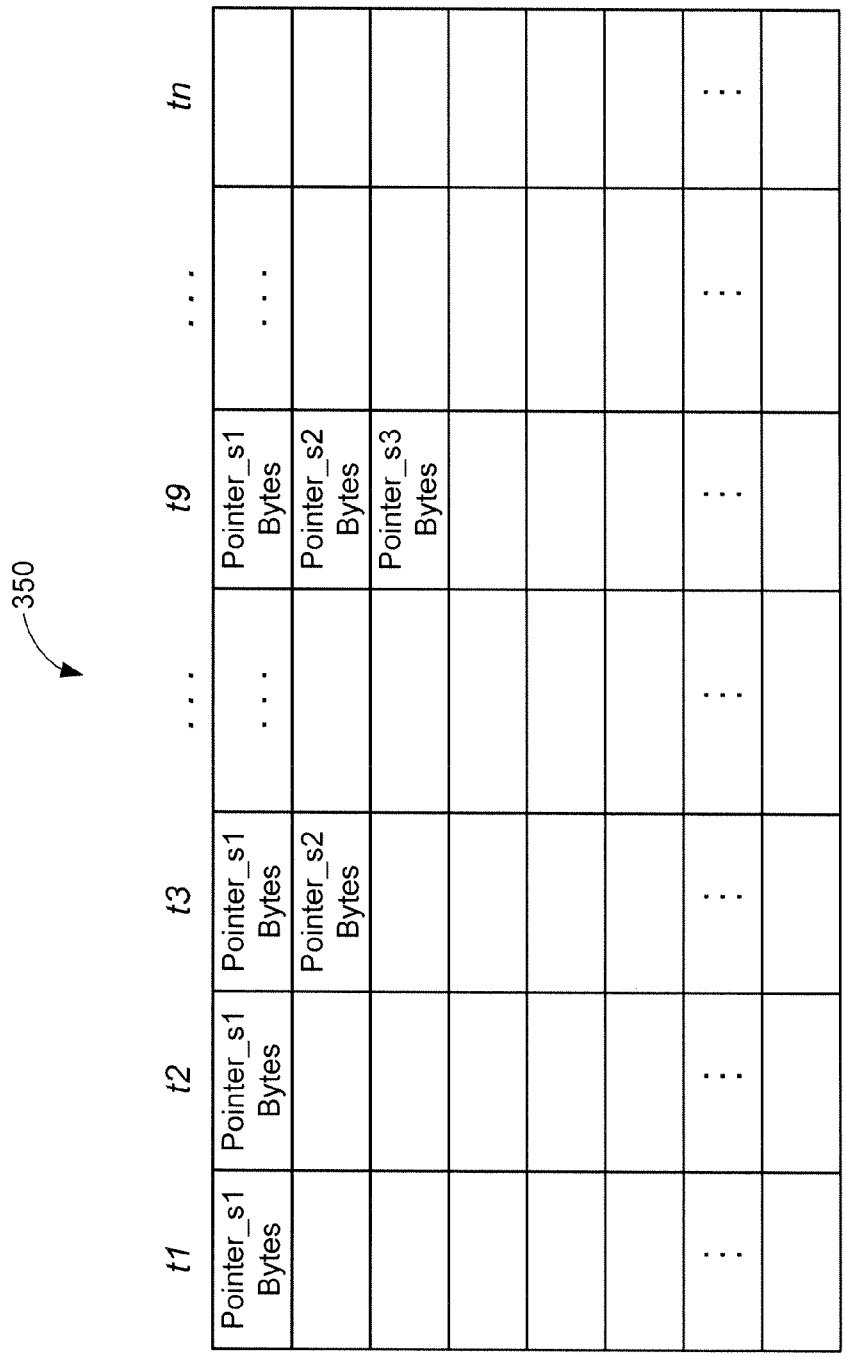
FIG. 3B is a illustration of an example index for fast retrieval of subscriber usage data.

FIG. 3B is a illustration of an example index 350 for fast retrieval of subscriber usage data. The index 350 may include a number of columns, where each column represents a time slot for a particular network component. Under each column there may be a number of entries where each entry represents a subscriber that was using the network component during the respective time slot. The entry may include a number of bytes transmitted during that time slot and a pointer to additional data about the packet data communication that occurred during that time slot.

For example, during the first two time slots shown in index 300 (e.g., the time slots corresponding to columns t1 and t2), only subscriber s1 was using the network component. Each of the first two time slots includes the number of bytes transmitted by subscriber s1 during the respective time slots as well as a pointer to additional information about the packet data communication that occurred during those time slots. During third time slot shown in index 300, two subscribers (subscriber s1 and s2) were using the network component. Accordingly, the third time slot includes two entries: one entry for subscriber s1, showing the number of bytes transmitted by subscriber s1 during the third time slot as well as a pointer to additional information about subscriber s1's packet data communication that occurred during the third time slot; and one entry for subscriber s2, showing the number of bytes transmitted by subscriber s2 during the third time slot as well as a pointer to additional information about subscriber s2's packet data communication that occurred during the third time slot.

Figure 4:
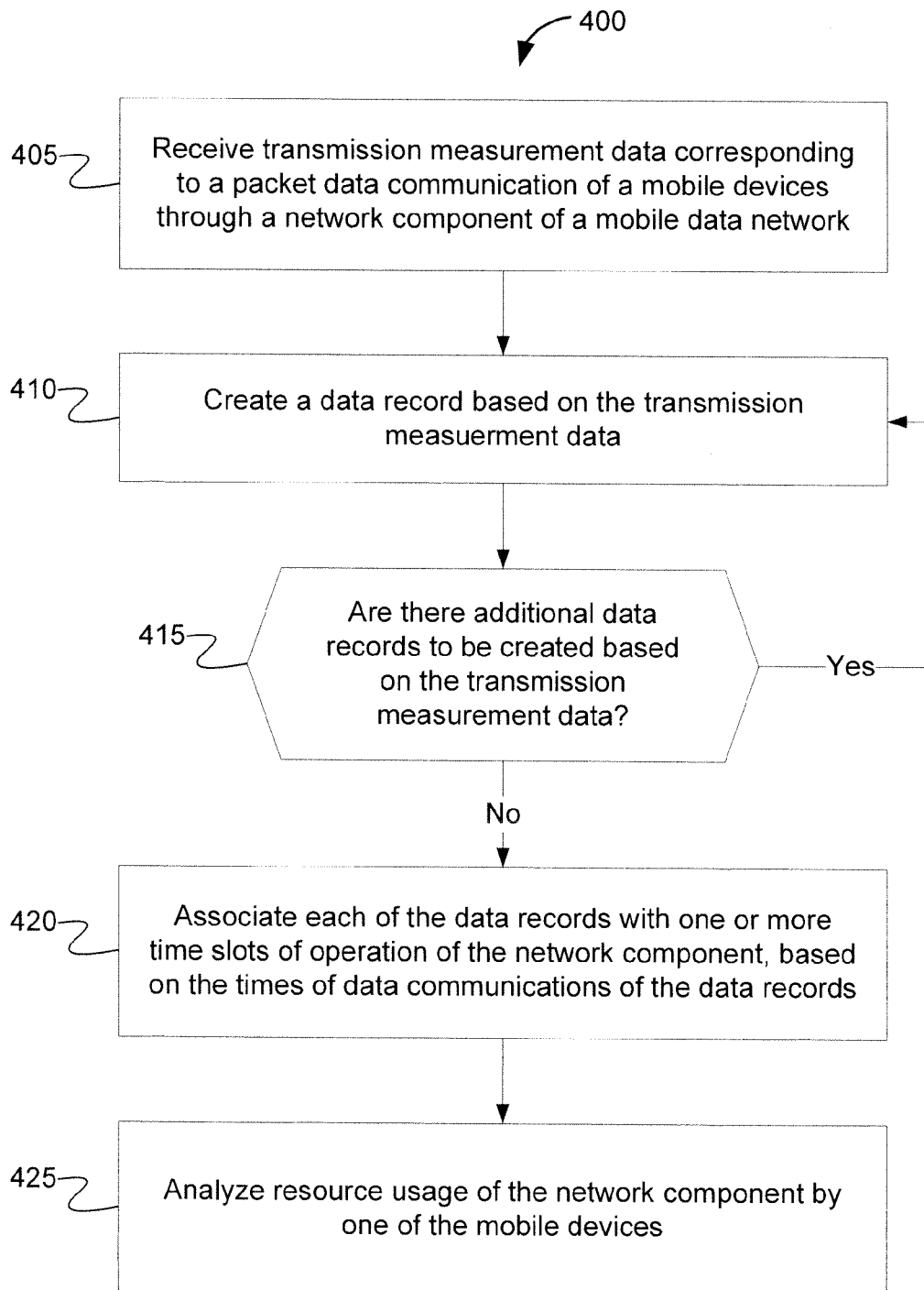
FIG. 4 is a flow diagram illustrating an example of a process for analyzing resource usage of a network component.

FIG. 4 is a flow diagram illustrating an example of a process for analyzing resource usage of a network component. Although FIG. 4 shows a number of operations, other examples may include additional operations, fewer operations, or substitute operations. Furthermore, some operations illustrated in FIG. 4 may occur in one or more different orders or in parallel in some cases as the operations are described by way of example only.

Initially, at operation 405, a data record server 125 may receive transmission measurement data from one or more network components, such as base stations, nodes (e.g., an EnodeB node), or other network components, in a mobile data network. The transmission measurement data may have been collected by the one or more network components and specify information associated with one or more packet data communications that use the network components. The transmission measurement data also identifies one or more subscribers or mobile devices that transmitted or received those packet data communications.

For example, FIG. 5 shows various fields of information, which may be included in transmission measurement data. The information may include an identifier that identifies the network component used in transmitting a packet data communication (e.g., a Network Component ID), an identifier of the subscriber or the subscriber's mobile device associated with the packet data communication (e.g., a Device ID), a time for the packet data communication, and one or more resources used in transmitting the packet data communication (e.g., an amount of data transmitted). The time for the packet data communication may be a start time and a stop time for the packet data communication, a start time and a duration, or any other value that may be used to determine the time of the packet data communication.

Referring back to FIG. 4, at operation 410, the data record server 125 may create a data record for each of the packet data communications using the information contained in the transmission measurement data. The data record server 125 may determine whether the transmission measurement data contains information for more than one packet data communications. If there are additional data records to be created based on the transmission measurement data at operation 415, the data record server 125 may create those data records. Otherwise, the process may proceed to operation 420.

The data record server 125 identify data records corresponding to a particular network component and, for each of those data records, associate the data record with one or more time slots (e.g., time periods or bins) in a data measurement compilation 231 at operation 420. The time slots that the data records are associated with may be for the network component that the data records correspond to. Furthermore, the data records may be associated with the time slots based on the time of the packet data communication as indicated in the data record. For example, referring to FIG. 3A, if the data record indicates that a packet data communication for subscriber s2 using network component 219 occurred start at a time corresponding to time t5 and ending at a time corresponding to time t9, the data record server 125 may associate the data record with the time slots occurring between time t5 and t9.

Although the time period between the start time and the end time as indicated by the data record may not match the time slots occurring between t5 and t9 exactly, the two time periods may be considered to correspond to one another if the time period between the start time and end time spans, at least partially, into the time slots occurring between t5 and t9. For example, the start time falls into the time slot between time t5 and t6 and the end time falls into the time slot between time t8 and t9.

For each network resource used, as indicated by the data record, the data record server 125 may also allocate a portion of the amount of the resource used to those time slots. In one variation, the data record server 125 may allocate the amount of the resource used evenly among the time slots by calculating an average amount of the resource used per time slot and allocating the average amount to each of the time slots. For example, turning to our previous example, if the data record indicates that 12 megabytes of data were transferred for subscriber s2 and that data is to be allocated to the four time slots occurring between t5 and t9, the data record server 125 may calculate an average amount of data transferred per time slot (e.g., 12 megabytes/4 time slots=3 megabytes/timeslot) and allocate that value (e.g., 3 megabytes) to each of the 4 time slots. The other data records created by the data record server 125 may be similarly processed.

After the records are associated with time slots in the data measurement compilation 231, at operation 425, the data record server 125 may analyze the resource usage of the network component by one or more of the subscribers or mobile devices. The resource usage may be analyzed in various ways. To illustrate, the resource usage may be analyzed based on a network component or group of network components, based on one or more subscriber, based on one or more time periods time period, or based on a combination of these. For example, one or more network components may be selected for analysis. The data records for the selected network components may be processed to determine, among other things, which subscribers or mobile devices are using the selected network components and when, when the peak demand periods are for the selected network components, which subscribers or mobile devices are using the selected network components the most, and which subscribers or mobile devices are using the selected network components during the peak demand periods. One or more mobile devices with the greatest resource usage for the selected network components may also be identified.

In another example, a time period may be selected for analysis. The data records corresponding to the selected time period may be processed to determine, among other things, which network components are under the heaviest use during the selected time period or which mobile devices use the mobile communication network the most during the selected time period (e.g., identifying the mobile devices with the greatest resource usage for the network component for a selected time period) and which network components the subscribers' mobile devices use. One or more subscribers or mobile devices may also be selected for analysis, which may cause data records corresponding to the selected subscribers or mobile devices may be processed. Based on the processing, the data record server 125 may determine which network components the selected subscribers are using and when the subscribers' mobile devices are using the particular network components, which network components the selected subscribers use the most and when, or what are the peak use periods for the selected subscribers. Different subscribers or groups of subscribers may also be compared to determine similarities and differences in network resource use. Furthermore, combinations of different factors (e.g., selected network components, selected subscribers, or selected time periods) may be used in processing data records and analyzing network resource usage. In some cases, the data record server 125 may process data records and analyze network resource usage in response to receiving a request from a user or client to analyze network resource usage. For example, the request may be received from a network administrator or other personnel using a terminal or computer 123 in the mobile communication network 121 or from a mobile device such as mobile device 113*d*. The request may further include one or more factors to use in analyzing network resource usage.

Figure 6:
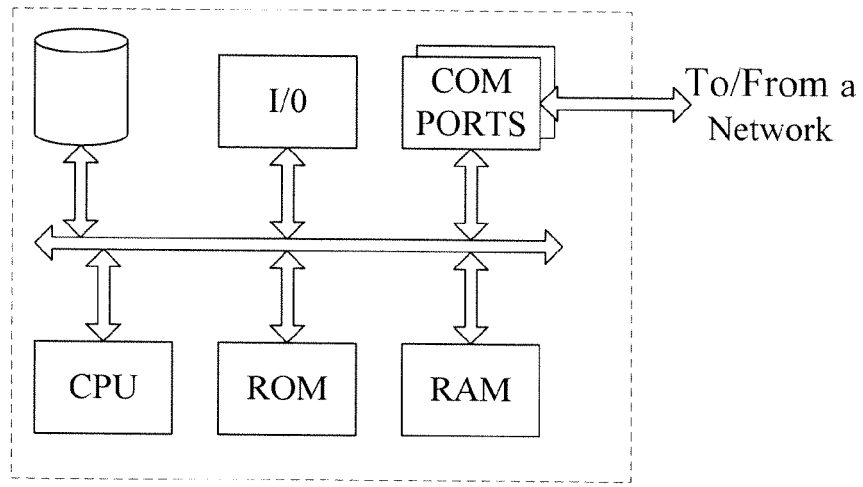
FIG. 6 is a simplified functional block diagram of a computer that may be configured as a host or server, for example, to function as the data record server of FIG. 1.
Figure 7:
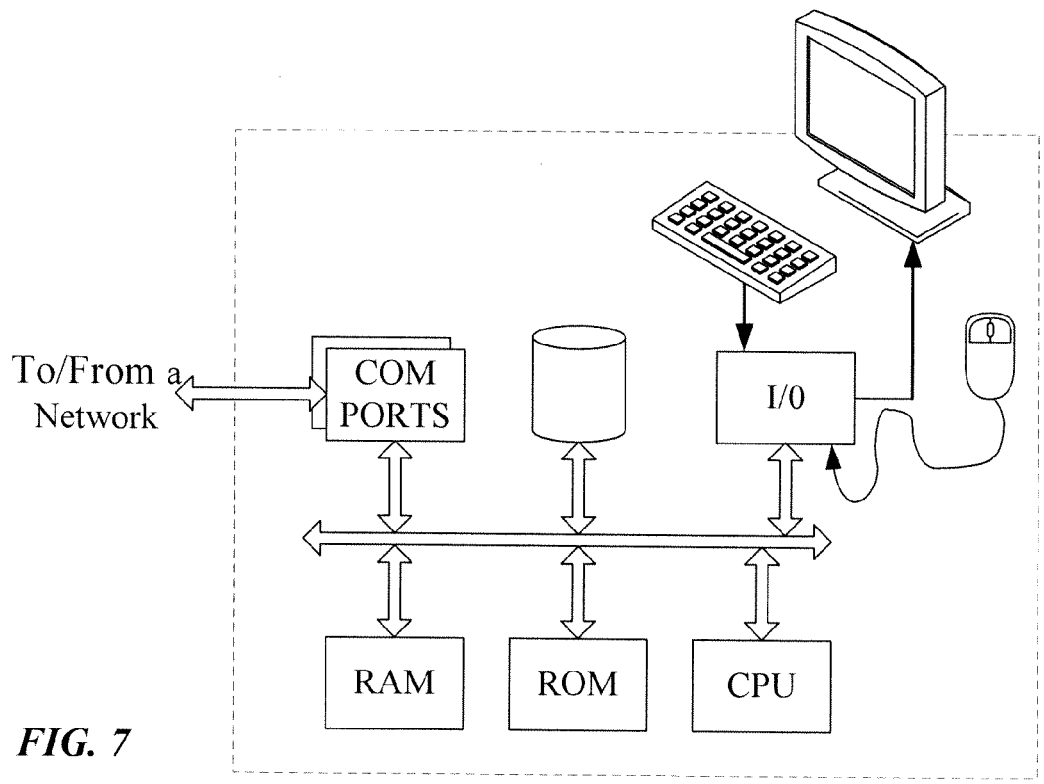
FIG. 7 is a simplified functional block diagram of a personal computer or other work station or terminal device.

FIGS. 6 and 7 provide functional block diagram illustrations of general purpose computer hardware platforms. FIG. 6 illustrates a network or host computer platform, as may typically be used to implement a server. For example, the computer platform of FIG. 6 may be used to implement SGW server 107, PGW server 109, or data record server 125 in FIG. 1. FIG. 7 depicts a computer with user interface elements, as may be used to implement a personal computer or other type of work station or terminal device, although the computer of FIG. 7 may also act as a server if appropriately programmed. For example, the computer of FIG. 7 may be used to mobile devices 113*a* to 113*d* or the terminal or computer 123 in FIG. 1. It is believed that the general structure and general operation of such equipment as shown in FIGS. 6 and 7 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 7). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of analyzing network resource usage of network components outlined above may be embodied in programming. The computer 123, the data record server 125, or other entities in the mobile communication network 121 in FIG. 1 may be configured to execute at least some operation involved in the analyzing network resource usage of network components. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Nonvolatile storage media include, for example, optical or magnetic disks, such as any of the storage devices in any computer(s) or the like, such as may be used to implement the data measurement record database, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising steps of:
   receiving, via a mobile data network, packet data communication information for a plurality of mobile devices;
   creating, using a processor, a data record of each packet data communication of each of the plurality of mobile devices through a network component of the mobile data network based on the packet data communication information, each data record including:
     time of a respective packet data communication,
     an identification of a mobile device involved in the respective packet data communication, and
     an amount of usage of a resource of the network component by the respective packet data communication;
   associating, using the processor, each of the data records with one or more time slots of operation of the network component, based on the times of packet data communications of the data records,
   wherein, for data records for respective packet data communications spanning at least partially into a plurality of the time slots, the associating step includes:
     associating each data record for a respective packet data communication spanning at least partially into a plurality of time slots with each of the time slots the respective packet data communication at least partially spanned into, and
     allocating the amount of usage of the resource of the network component for the respective packet data communication spanning at least partially into a plurality of time slots among the time slots the respective packet data communication at least partially spanned into; and
   analyzing resource usage of the network component by one of the mobile devices by processing resource usage amount of each data record associated with the network component having the identification of the one mobile device.

2. The method of claim 1, further comprising receiving a request to analyze resource usage of the network component, and wherein the analyzing of the resource usage of the network component is performed in response to the receiving of the request.

3. The method of claim 1, further comprising:
receiving a request to analyze resource usage for a selected time period;
wherein the analyzing of the resource usage of the network component is performed in response to the receiving of the request; and
wherein the analyzing of the resource usage of the network component comprises processing resource usage amount of each data record associated with time slots corresponding to the selected time period.

4. The method of claim 3, wherein the analyzing of the resource usage of the network component comprises identifying a mobile device with the greatest resource usage for the network component for the selected time period.

5. The method of claim 1, wherein the time of each respective packet data communication includes a start time and a stop time for each respective packet data communication.

6. The method of claim 1, wherein each amount of usage for each respective packet data communication comprises one or more of:
number of bytes received from the respective mobile device;
number of bytes transmitted to the respective mobile device;
load on a processor of the network component; and
bandwidth used by the for each respective packet data communication.

7. The method of claim 1, the allocating of the portion of the amount of usage of the resource of the network component comprises:
calculating an average amount of usage for the plurality of time slots; and
allocating the average amount of usage to each of the plurality of time slots the respective packet data communication at least partially spanned into.

8. The method of claim 1, wherein the network component comprises an E-UTRAN Node B (EnodeB).

9. The method of claim 1, wherein the identification of the mobile device comprises an International Mobile Subscriber Identity (IMSI).

10. A system comprising:
one or more processors; and
a machine-readable medium comprising instructions stored therein, which when executed by the one or more processors, cause the one or more processors to perform operations, including operations to:
create a data record of each packet data communication of each of a plurality of mobile devices through a network component of a mobile data network, each data record including:
time of a respective packet data communication,
an identification of a subscriber involved in the respective packet data communication, and
an amount of usage of a resource of the network component by the respective packet data communication;
associate each of the data records with one or more time slots of operation of the network component, based on the times of packet data communications of the data records,
wherein, for data records for respective packet data communications spanning at least partially into a plurality of the time slots, the operation to associate includes operations to:
associate each data record for a respective packet data communication spanning at least partially into a plurality of time slots with each of the time slots the respective packet data communication at least partially spanned into, and
allocate the amount of usage of the resource of the network component for the respective packet data communication spanning at least partially into a plurality of time slots among the time slots the respective packet data communication at least partially spanned into; and
analyze resource usage of the network component by one of the subscribers by processing resource usage amount of each data record associated with the network component having the identification of the one mobile device.

11. The system of claim 10, wherein the operations further comprise operations to receive a request to analyze resource usage of the network component, and wherein the processing of the resource usage amount is performed in response to the receiving of the request.

12. The system of claim 10, wherein the operation to analyze the resource usage of the network component comprises processing resource usage amount of each data record associated with time slots corresponding to the selected time period.

13. The system of claim 12, wherein the operation to analyze the resource usage of the network component comprises identifying a mobile device with the greatest resource usage for the network component for the selected time period.

14. The system of claim 10, wherein each amount of usage for each respective packet data communication comprises a number of bytes transferred on behalf of the respective subscriber.

15. The system of claim 10, wherein the operations further comprise operations to:
calculate an average amount of usage for the plurality of time slots; and
allocate the average amount of usage to each of the plurality of time slots the respective packet data communication at least partially spanned into.

16. The system of claim 10, wherein the network component comprises an E-UTRAN Node B (EnodeB).

17. A non-transitory machine-readable medium comprising instructions stored therein, which when executed by a processor, cause the processor to perform operations comprising operations to:
create a data record of each packet data communication of each of a plurality of mobile devices through a network component of a mobile data network, each data record including:
time of a respective packet data communication,
an identification of a mobile device involved in the respective packet data communication, and
an amount of usage of a resource of the network component by the respective packet data communication;
associate each of the data records with one or more time slots of operation of the network component, based on the times of packet data communications of the data records,
wherein, for data records for respective packet data communications spanning at least partially into a plurality of the time slots, the operation to associate includes allocating the amount of usage of the resource of the network component for a respective packet data communication spanning at least partially into a plurality of time slots among the time slots the respective packet data communication at least partially spanned into; and analyze resource usage of the network component by one of the mobile devices by processing resource usage amount of each data record associated with the network component.

18. The non-transitory machine-readable medium of claim 17, wherein the operations further comprise operations to receive a request to analyze resource usage of the network component, and wherein the analyzing of the resource usage of the network component is performed in response to the receiving of the request.

19. The non-transitory machine-readable medium of claim 17, wherein the operation to analyze of the resource usage of the network component comprises at least one of processing resource usage amount of each data record associated with time slots corresponding to the selected time period and processing resource usage amount of each data record having an identification of a mobile device corresponding with a selected subscriber.

20. The non-transitory machine-readable medium of claim 17, wherein each amount of usage for each respective packet data communication comprises one or more of:
  number of bytes received from the respective mobile device;
  number of bytes transmitted to the respective mobile device;
  load on a processor of the network component; and
  bandwidth used by the for each respective packet data communication.

\* \* \* \* \*